US 12,331,686 B1

United States Patent
Chandler

(10) Patent No.: US 12,331,686 B1
(45) Date of Patent: Jun. 17, 2025

(54) CIRCUMFERENTIAL FLOW CONDENSER ARRANGEMENT FOR AN AIRCRAFT PROPULSION SYSTEM

(71) Applicant: RTX CORPORATION, Farmington, CT (US)

(72) Inventor: Jesse M. Chandler, S. Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/678,576

(22) Filed: May 30, 2024

(51) Int. Cl.
- *F02C 3/30* (2006.01)
- *F02C 3/22* (2006.01)
- *F02C 7/141* (2006.01)

(52) U.S. Cl.
CPC ............ *F02C 7/141* (2013.01); *F02C 3/22* (2013.01); *F02C 3/305* (2013.01); *F05D 2260/213* (2013.01); *F05D 2260/606* (2013.01)

(58) Field of Classification Search
None
See application file for complete search history.

(56) References Cited

U.S. PATENT DOCUMENTS

| | | | | |
|---|---|---|---|---|
| 5,363,641 | A * | 11/1994 | Dixon | F02C 6/08 60/788 |
| 11,603,798 | B1 * | 3/2023 | Terwilliger | F02C 7/18 |
| 11,927,132 | B1 | 3/2024 | Terwilliger et al. | |
| 2005/0060983 | A1 * | 3/2005 | Lardellier | F02K 3/06 60/262 |
| 2011/0056208 | A1 * | 3/2011 | Norris | F02C 7/36 60/792 |
| 2011/0115227 | A1 * | 5/2011 | Shafer | F02K 3/115 290/52 |
| 2013/0000314 | A1 * | 1/2013 | McCaffrey | F01D 13/003 60/773 |
| 2015/0322855 | A1 * | 11/2015 | Kupratis | F02C 3/06 60/805 |
| 2016/0169102 | A1 * | 6/2016 | Hanrahan | F02K 3/115 60/39.42 |
| 2021/0207500 | A1 * | 7/2021 | Klingels | F02C 3/305 |
| 2023/0258126 | A1 * | 8/2023 | Terwilliger | F02C 1/005 60/39.182 |
| 2023/0286661 | A1 * | 9/2023 | Klingels | F02C 7/16 |
| 2023/0323814 | A1 | 10/2023 | Terwilliger et al. | |
| 2023/0407768 | A1 * | 12/2023 | Staubach | F01K 15/02 |
| 2024/0124147 | A1 * | 4/2024 | Bowden | F02C 7/20 |

FOREIGN PATENT DOCUMENTS

| | | | | |
|---|---|---|---|---|
| DE | 102022115585 A1 * | 1/2024 | | F02C 3/305 |
| WO | WO-2023246980 A1 * | 12/2023 | | F02C 3/305 |

* cited by examiner

*Primary Examiner* — Todd E Manahan
*Assistant Examiner* — Marc Amar
(74) *Attorney, Agent, or Firm* — Carlson, Gaskey & Olds, P.C.

(57) ABSTRACT

An aircraft propulsion system includes a series of condensers where water is condensed from the exhaust gas flow. Each of the series of condensers define a passage for exhaust gas flow such that water recovered from the exhaust gas flow drains at a downward angle in a direction of gravity through each of the series of condensers. A series of water separators separate the exhaust gas flow from water condensed in a corresponding one of the series of condensers and the water is transformed into a steam flow in an evaporator system for communication to the combustor.

14 Claims, 5 Drawing Sheets

CIRCUMFERENTIAL FLOW CONDENSER ARRANGEMENT FOR AN AIRCRAFT PROPULSION SYSTEM

TECHNICAL FIELD

The present disclosure relates generally to a condenser arrangement of a water recovery system of an aircraft propulsion system.

BACKGROUND

An aircraft propulsion system typically includes a gas turbine engine with a fan section, a compressor section, a combustor section, and a turbine section. Air entering the compressor section is compressed and delivered into the combustion section where it is mixed with fuel and ignited to generate a high-energy exhaust gas flow. Energy in the high energy exhaust flow is recovered as it is expanded through a turbine section. A large amount of energy in the form of heat is simply exhausted from the turbine section to atmosphere. Steam injection can provide improved propulsive efficiencies by increasing mass flow without a corresponding increase in work. Water recovered from the exhaust gas flow may be transformed into steam using thermal energy from the exhaust gas flow. Water recovery is performed with condensing heat exchangers arranged relative to the engine that direct water to an evaporative heat exchanger.

Turbine engine manufacturers continue to seek further improvements to engine performance including improvements to thermal, transfer and propulsive efficiencies.

SUMMARY

An aircraft propulsion system according to an exemplary embodiment of this disclosure includes, among other possible things, a core engine including a compressor, combustor, and turbine section. An inlet airflow is compressed communicated to the combustor, mixed with fuel, and ignited to generate an exhaust gas flow that is expanded through the turbine section. A propulsive fan is driven about a propulsor axis by the core engine and a series of condensers where water is condensed from the exhaust gas flow. Each of the series of condensers define a passage for exhaust gas flow such that water recovered from the exhaust gas flow drains at a downward angle in a direction of gravity through each of the series of condensers, a series of water separators where condensed water is separated from the exhaust gas flow from a corresponding one of the series of condensers, and an evaporator system where water from the series of water separators is transformed into a steam flow and communicated to the combustor.

In a further embodiment of the foregoing aircraft propulsion system, each of the series of condensers include an inner surface spaced radially apart from an outer surface, an upper side spaced circumferentially from a lower side, and a passage that extends between the upper side and the lower side.

In a further embodiment of any of the foregoing aircraft propulsion systems, each of the series of water separators is disposed along the lower side of the corresponding one of the series of condensers.

In a further embodiment of any of the foregoing aircraft propulsion systems, the system includes a cooling air duct assembly where a portion of airflow exiting the propulsive fan is communicated to each of the series of condensers for providing a cooling flow through each of the series of condensers.

In a further embodiment of any of the foregoing aircraft propulsion systems, the system includes a bypass air duct assembly where a portion of the airflow exiting the propulsive fan is bypassed around the series of condensers and the core engine.

In a further embodiment of any of the foregoing aircraft propulsion systems, the turbine section of the core engine is engine forward of the combustor and the compressor section and an inlet duct assembly communicates a portion of the inlet airflow to an inlet that is disposed aft of the compressor section.

In a further embodiment of any of the foregoing aircraft propulsion systems, the system includes a power turbine coupled to drive the propulsor, the power turbine disposed engine forward of the core engine.

In a further embodiment of any of the foregoing aircraft propulsion systems, the evaporator system is disposed forward of the turbine section, receives the exhaust gas flow from the turbine section and communicates the exhaust gas flow to a corresponding one of the series of condensers.

In a further embodiment of any of the foregoing aircraft propulsion systems, the system includes a plurality of radially extending ducts where exhaust gas flow is communicated to a corresponding one of the series of condensers.

In a further embodiment of any of the foregoing aircraft propulsion systems, the system includes a nozzle assembly having a separate circumferential outlet for each of the exhaust gas flow from the water separator, a bypass airflow, and the cooling airflow.

In a further embodiment of any of the foregoing aircraft propulsion systems, the nozzle assembly is part of a nacelle assembly disposed about the propulsor and the core engine.

In a further embodiment of any of the foregoing aircraft propulsion systems, the system includes an intercooling system where a portion of water recovered from the exhaust gas flow is injected into the compressor for cooling a core flow.

A water recovery system for an aircraft propulsion system according to an exemplary embodiment of this disclosure includes, among other possible things, a series of condensers where water is condensed from an exhaust gas flow. Each of the series of condensers define a passage for an exhaust gas flow such that water recovered from the exhaust gas flow drains downward in a direction of gravity through each of the series of condensers and a series of water separators where condensed water is separated from the exhaust gas flow from a corresponding one of the series of condensers.

In a further embodiment of the foregoing water recovery system, the system includes an evaporator system where \water from the series of water separators is transformed into a steam flow and communicated to a combustor.

In a further embodiment of any of the foregoing water recovery systems, the evaporator system includes a plurality of evaporators that communicate exhaust gas flow radially outward to a corresponding one of the series of condensers.

In a further embodiment of any of the foregoing water recovery systems, each of the series of condensers include a top spaced radially apart from a bottom, an upper side spaced circumferentially from a lower side, a forward side and an aft side, and the passage extends between the upper side and the lower side. Each of the series of water separators is disposed along the lower side of the corresponding one of the series of condensers.

In a further embodiment of any of the foregoing water recovery systems, the system includes a nacelle. The series of condenser and the series of water separators are supported in the nacelle. The nacelle includes a cooling air duct assembly where a portion of inlet airflow is communicated to each of the series of condensers for providing a cooling flow through each of the series of condensers.

In a further embodiment of any of the foregoing water recovery systems, the nacelle includes a bypass air duct assembly where a portion of an inlet airflow is bypassed around the series of condensers and a core engine.

A method of operating an aircraft propulsion system according to an exemplary embodiment of this disclosure includes, among other possible things, generating an exhaust gas flow with a core engine including a compressor, combustor, and turbine section, coupling a propulsor to a power turbine configured to be driven by expansion of the exhaust gas flow about a propulsor axis by the core engine, and condensing water in a series of condensers that each include a passage for the exhaust gas flow. The passage for the exhaust gas flow is defined such that water recovered from the exhaust gas flow drains downward in a direction of gravity, separating water from the exhaust gas flow in one of a series of water separators in flow communication with the passage of a corresponding one of the series of condensers, and generating a steam flow in an evaporator system from water received from the series of water separators.

In a further embodiment of the foregoing method, the method includes communicating a cooling airflow to each of the series of condensers through a cooling air duct assembly and bypassing a portion of an inlet airflow around the series of condensers and the core engine.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
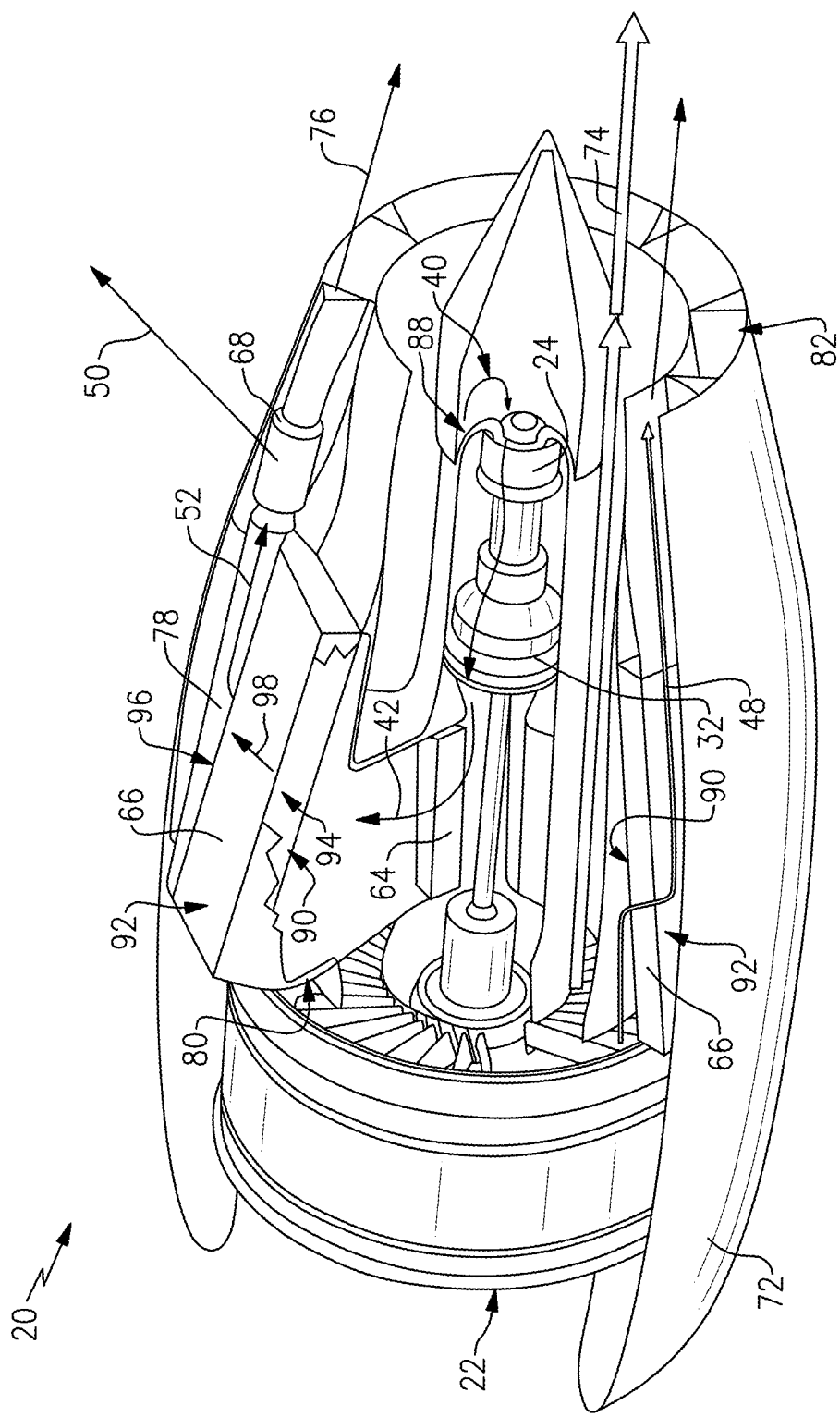
FIG. 1 is a partial schematic cutaway view of the example aircraft propulsion system.
Figure 2:
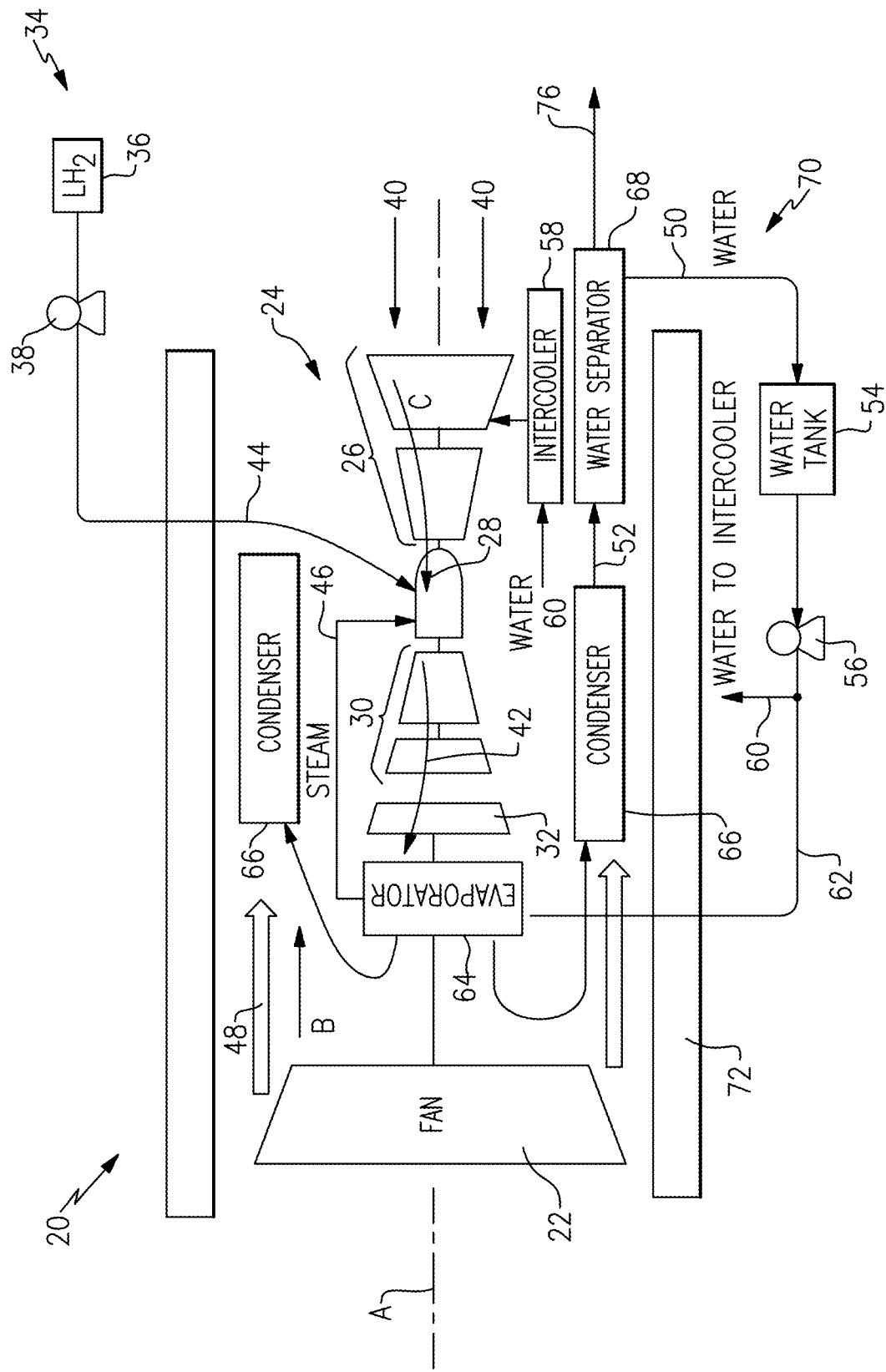
FIG. 2 is a schematic view of an example aircraft propulsion system.

FIGS. 1 and 2 schematically illustrate an aircraft propulsion system 20 that generates a steam flow 46 with water 44 recovered from an exhaust gas flow 42. A water recovery system 70 condenses water from the gas flow 42 in a series of condensers 66 that are arranged circumferentially about an engine axis A. Exhaust gas flows through the condensers 66 within a passage 98 such that condensate flows downward toward a bottom location within a nacelle 72 to reduce, or prevent an accumulation of water. The example condensers 66 is aligned about a circumference of the nacelle 72 to facilitate condensate drainage and flow.

The example propulsion system 20 includes a propulsive fan 22 and a reverse core engine 24. The example core engine 24 includes a compressor section 26, a combustor section 28 and the turbine section 30 disposed along an engine longitudinal propulsor axis A. The turbine section 30 is disposed engine forward of the combustor 28 and the compressor section 26. A power turbine 32 is arranged forward of the turbine section 30 and is driven by the exhaust gas flow 42 from the turbine section 30. The power turbine 32 is coupled to the drive the fan 22 and is rotatable independent of structures in the core engine 24. The power turbine 32 is not mechanically coupled to the core engine 24.

The fan 22 drives a bypass airflow 48 along a bypass flow path B, while the compressor section 26 draws an inlet flow 40 through an inlet duct 88 and along a core flow path C. The inlet flow 40 is turned 180 degrees into the compressor section 26 by the inlet duct 88. The inlet flow 40 is compressed and communicated to the combustor section 28 where the compressed inlet flow 40 is mixed with a fuel flow 44 and ignited to generate an exhaust gas flow 42. The exhaust gas flow 42 expands through the turbine section 30 where energy is extracted and utilized to drive compressor section 26. The exhaust gas flow 42 further expands through the power turbine 32 to drive the fan 22.

In addition to the fuel 44, a steam flow 46 is introduced into the combustor 26. The steam flow 46 may be injected at the combustor 28 or a location upstream of the combustor 28 for communication into the combustor 26. Performance is improved by increasing turbine mass flow and power output without additional work required by the compressor section 26.

A fuel system 34 includes at least a fuel tank 36 and a fuel pump 38 to provide the fuel flow 44 to the combustor 28. The example fuel system 34 is configured to provide a hydrogen based fuel such as a liquid hydrogen ($LH_2$). Although hydrogen is disclosed by way of example, other non-carbon based fuels could be utilized and are within the contemplation of this disclosure. Moreover, the disclosed features may also be beneficial in an engine configured to operate with traditional carbon fuels and/or biofuels, such as sustainable aviation fuel.

The example propulsion system 20 may further include an intercooler 58 for injecting an intercooling water flow 60 into the compressor section 26 to reduce a temperature of the inlet airflow 40 and increase mass flow. Reduced temperatures and increased mass flow provided by injection of water increases compressor efficiency.

Although an example engine architecture is disclosed by way of example, other turbine engine architectures, are within the contemplation and scope of this disclosure. For example, the core engine 24 is disclosed by way of example as disposed along the longitudinal axis A, however different orientations of the core engine 24 may be used and are within the contemplation of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

The water recovery system 70 includes the condensers 66, water separators 68, and a water storage tank 54 that provides for the accumulation of a volume of water required for production of sufficient amounts of steam. Water recovered from the exhaust gas flow 42 is driven by pump 56 to provide a pressurized water flow 62 to one of a plurality of evaporators 64 and/or the intercooler 58.

The example condensers 66 are arranged within the nacelle 72 circumscribing the core engine 24. The nacelle 72 includes ducting to direct bypass flow 74, cooling air flow 48 and the inlet flow 40. The bypass flow 74 is directed through a nozzle 82 that defines opening at an aft portion of the nacelle 72.

The example condensers 66 are supported by the nacelle 72 and fed an exhaust gas flow 42 emitted from the core engine 24 and the power turbine 32. The exhaust gas flow 42 first is routed through one of a series of evaporators 64 that are arranged relative to a corresponding one of a plurality of struts 80.

The flow path for the exhaust gas flow 42 from the evaporator 64 is radially outward through a corresponding strut 80 to a corresponding condenser 66. The exhaust gas flow 42 proceeds circumferentially through each of the condensers 66 into a corresponding one of a plurality of manifolds 78. Flow 52 exiting the condensers 66 is a mix of water and exhaust gases. The manifold 78 turns the flow axially aft into a corresponding water separator 68. In the water separator 68, a water flow 50 is separated from the exhaust gas flow 76. The exhaust gas flow 76 is emitted into the ambient environment.

The condensers 66 are exposed to a cooling bypass flow 48. The cooling flow 48 provides for condensing of the water and is communicated through an inner radial surface 90 to an outer radial surface 92. The exhaust gas flow 42 is communicated through one of a plurality of passages 98 between an upper side 94 and out a lower side 96. The lower side 96 is in communication with the manifold 78 that leads to the water separator 68. The upper side 94 and the lower side 94 are spaced circumferentially apart. Each of the condensers 66 are arranged such that exhaust gas flow 42 is communicated through the upper side 94 and flows downwardly through at least one passage 98 with the aid of gravity toward the lower side 96. Water flow follows the direction of gravity and therefore follows the downward circumferential path through each of the condensers 66.

Figure 3:
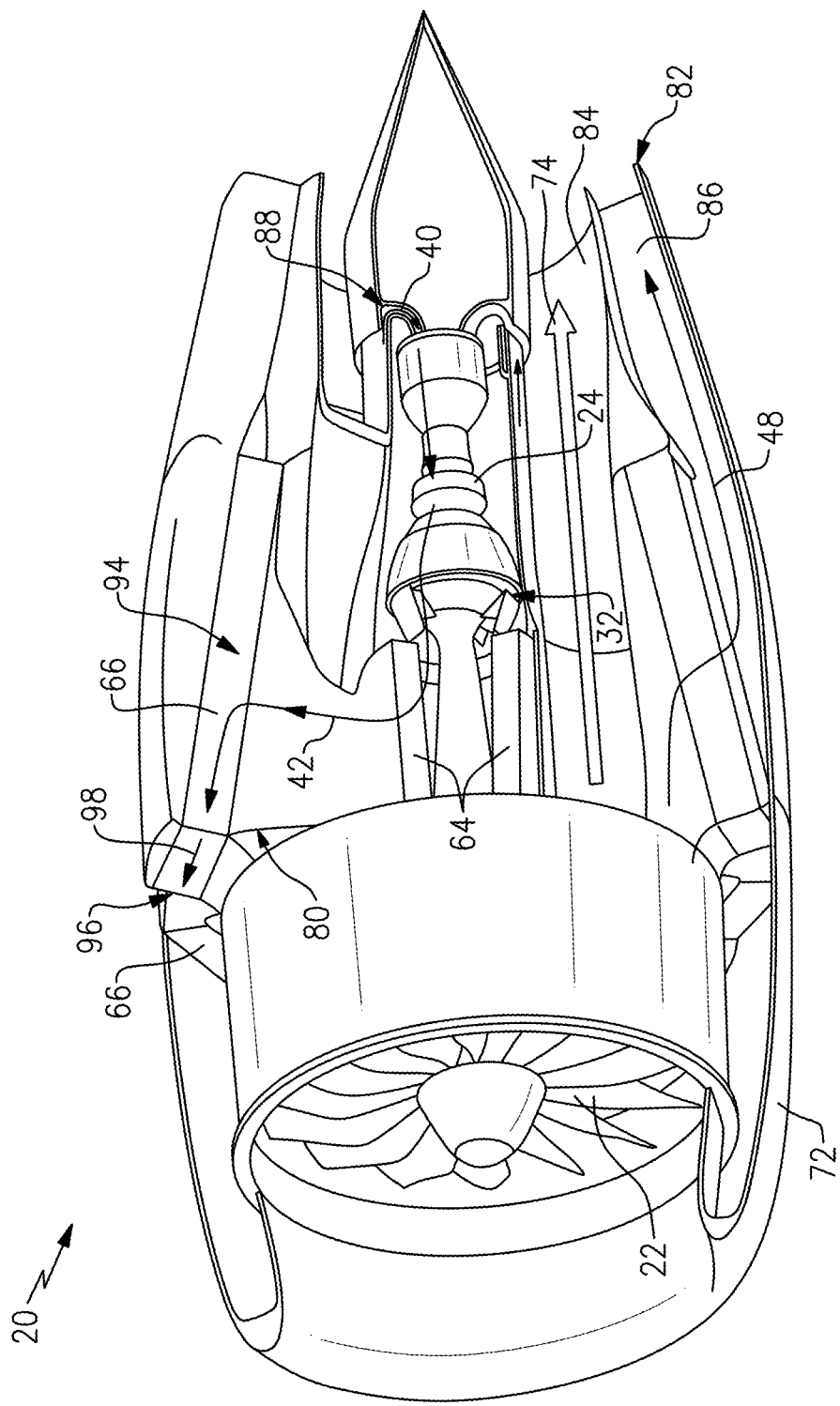
FIG. 3 is another partial schematic cutaway view of a portion of a water recovery system of an aircraft propulsion system.
Figure 4:
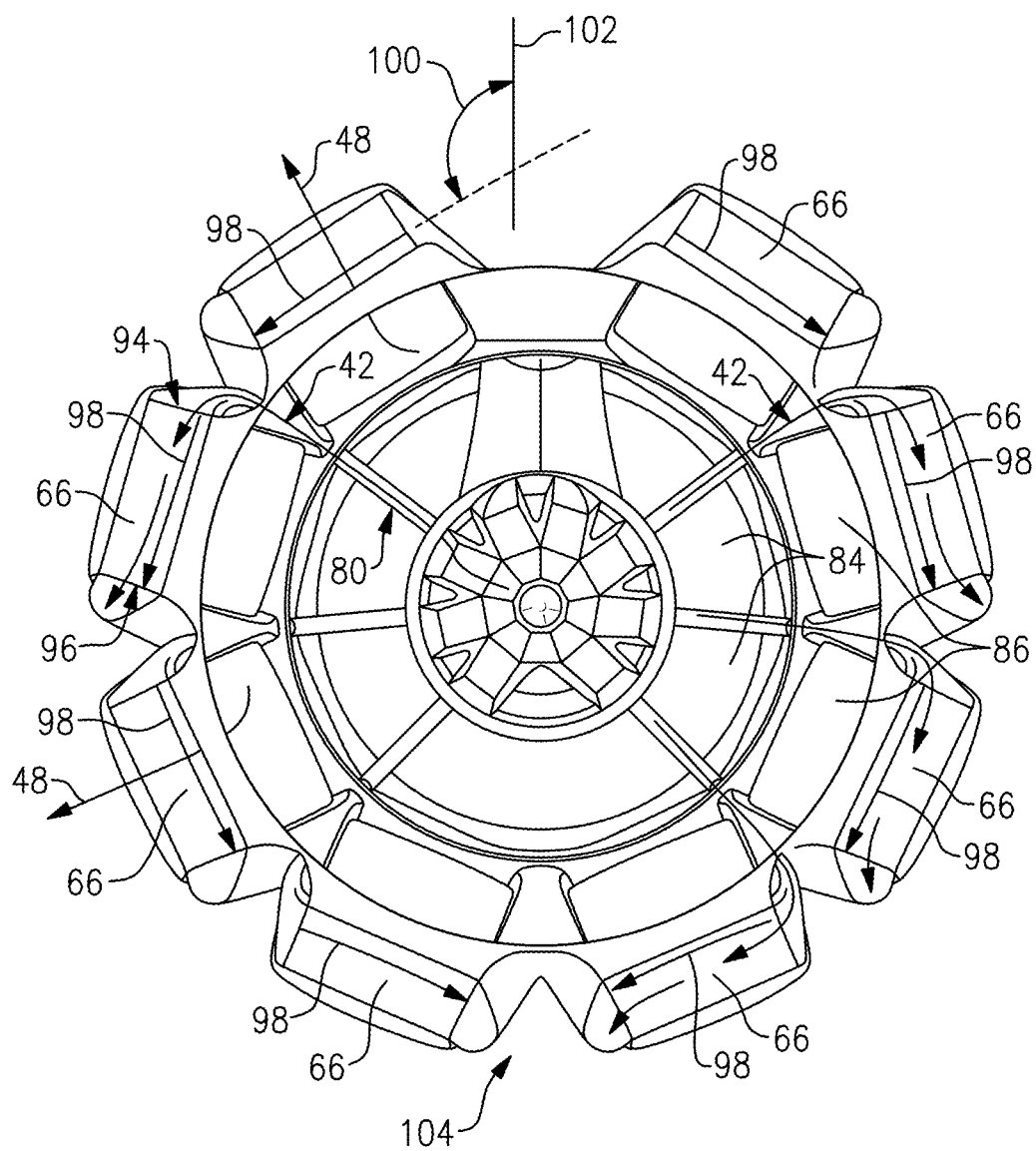
FIG. 4 is front view of the example water recovery system of the aircraft propulsion system without the fan.

Referring to FIGS. 3 and 4 with continued reference to FIG. 1, the exhaust gas flow 42 is communicated radially outward from a corresponding one of the evaporators 64 through a strut 80. The strut 80 may be a structural feature of the system 20 and/or may provide ducting for directing exhaust gas flow 42.

Each of the condensers 66 include an inner radial surface 90, the outer radial surface 92, the upper side 94 and the lower side 96. The passage 98 is defined through each of the condenser 66 between the upper side 94 and the lower side 96. The passage 98 is shown schematically and may include one or a plurality of passages 98 that define a pathway for exhaust gas flow 42 through the condenser 66.

The exhaust gas flow 42 is turned to flow through the passage 98 from the upper side 94 and toward the lower side 96 of each of the condensers 66. Each of the condensers 66, and thereby each of the passages 98 is angled downwardly relative to a vertical plane 102 such that the flow path between the upper side 94 and the lower side 96 of each condenser 66 has a downward angled slope indicated by the angle 100. The downward angled slope 100 facilitates water flow as more water is removed from the exhaust gas flow 42. The orientation of the condensers 66 provides for the flow of water condensed from the exhaust gas flow 42 toward a lower portion 104 of the propulsion system 20.

The nacelle 72 includes an outer duct 86 for exhausting the flow 76 from the water separator 68 through the nozzle 82. An inner duct 84 defines a path for the bypass flow 74 that is not communicated through one of the condensers 66. The inner duct 84 and the outer duct 86 both receive fan airflow.

Figure 5:
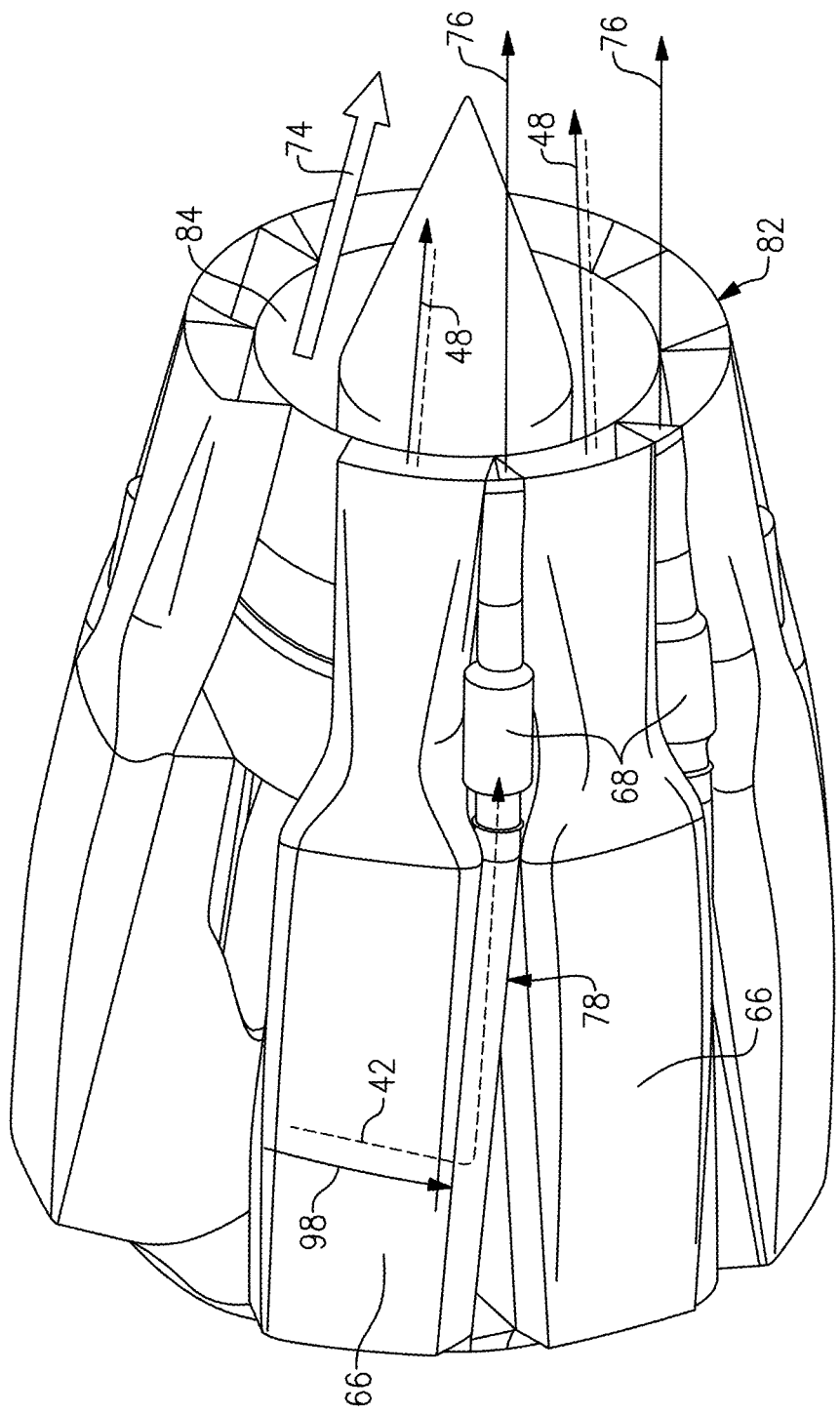
FIG. 5 is aft view of example condensers of a water recovery system.

Referring to FIG. 5, with continued reference to FIGS. 3 and 4, the nacelle 72 defines flow paths for the cooling flow 48, the bypass flow 74 and the exhaust gas flow 76. The bypass flow 74 and cooling flow 48 are split between the struts 80 and both originate from flow through the fan 22.

The water separators 68 are disposed between adjacent ones of the condensers 66 and define the exhaust flow path for the exhaust flow 76 emitted into the ambient environment. In one example embodiment, a series of condensers 66 are arranged circumferentially within the nacelle 72 and receive an exhaust gas flow 42 from one of a corresponding plurality of evaporators 64. Although the disclosed example embodiment includes an evaporator 64 for each of the plurality of condensers 66, a single evaporator 64 may communicate exhaust gas flow to several condensers 66.

The plurality of condensers 66 are arranged radially outward from each of the evaporators 64. The condensers 66 are arranged to have the upper side 94 higher that the lower side 96. In the disclosed example, a plurality of water separators 68 are arranged aft of a corresponding one of each of the condensers 66. Although the disclosed example includes a water separator 68 for each of the condensers 66, different numbers and configurations of water separators 68 could be utilized and are within the contemplation of this disclosure.

Accordingly, the example aircraft propulsion system 20 provides a circumferential flow direction through the series of condensers 66 to reduce, or prevent accumulation of water.

Although an example embodiment has been disclosed, a worker of ordinary skill in this art would recognize that certain modifications would come within the scope of this disclosure. For that reason, the following claims should be studied to determine the scope and content of this disclosure.

What is claimed is:
1. An aircraft propulsion system comprising:
a core engine including a compressor section, a combustor, a turbine section, and an inlet duct assembly, wherein an inlet airflow is compressed and communicated to the combustor, mixed with fuel, and ignited to generate an exhaust gas flow that is expanded through the turbine section, wherein the turbine section of the core engine is engine forward of the combustor and the compressor section and the inlet duct assembly includes an inlet that is disposed aft of the compressor section and communicates a portion of the inlet airflow to the compressor section;
a propulsive fan driven about a propulsor axis by the core engine;
a series of condensers where water is condensed from the exhaust gas flow, wherein each of the series of condensers define a passage for exhaust gas flow such that water recovered from the exhaust gas flow drains at a downward angle in a direction of gravity through each of the series of condensers, wherein each of the series of condensers include an inner surface spaced radially apart from an outer surface, an upper side spaced circumferentially from a lower side, and the passage extends between the upper side and the lower side;

a series of water separators where condensed water is separated from the exhaust gas flow from a corresponding one of the series of condensers;

an evaporator system where water from the series of water separators is transformed into a steam flow and communicated to the combustor, wherein the evaporator system is disposed forward of the turbine section, receives the exhaust gas flow from the turbine section and communicates the exhaust gas flow to a corresponding one of the series of condensers; and a cooling air duct assembly where a portion of airflow exiting the propulsive fan is communicated to each of the series of condensers for providing a cooling flow through each of the series of condensers.

2. The aircraft propulsion system as recited in claim 1, wherein each of the series of water separators is disposed along the lower side of the corresponding one of the series of condensers.

3. The aircraft propulsion system as recited in claim 1, comprising a bypass air duct assembly where a portion of the airflow exiting the propulsive fan is bypassed around the series of condensers and the core engine.

4. The aircraft propulsion system as recited in claim 1, comprising a power turbine coupled to drive the propulsive fan, the power turbine disposed engine forward of the core engine.

5. The aircraft propulsion system as recited in claim 4, comprising a plurality of radially extending ducts where exhaust gas flow is communicated to a corresponding one of the series of condensers.

6. The aircraft propulsion system as recited in claim 5, including a nozzle assembly having a separate circumferential outlet for each of the exhaust gas flow from the water separator, a bypass airflow, and the cooling airflow.

7. The aircraft propulsion system as recited in claim 6, wherein the nozzle assembly is part of a nacelle assembly disposed about the propulsive fan and the core engine.

8. The aircraft propulsion system as recited in claim 1, comprising an intercooling system where a portion of water recovered from the exhaust gas flow is injected into the compressor for cooling a core flow.

9. A water recovery system for an aircraft propulsion system comprising:

a series of condensers where water is condensed from an exhaust gas flow, wherein each of the series of condensers define a passage for exhaust gas flow such that water recovered from the exhaust gas flow drains downward in a direction of gravity through each of the series of condensers;

a series of water separators where condensed water is separated from the exhaust gas flow from a corresponding one of the series of condensers; and an evaporator system where water from the series of water separators is transformed into a steam flow and communicated to a combustor, wherein the evaporator system includes a plurality of evaporators that communicate exhaust gas flow radially outward to a corresponding one of the series of condensers.

10. The water recovery system as recited in claim 9, wherein each of the series of condensers include a top spaced radially apart from a bottom, an upper side spaced circumferentially from a lower side, a forward side and an aft side, and the passage extends between the upper side and the lower side and wherein each of the series of water separators is disposed along the lower side of the corresponding one of the series of condensers.

11. A water recovery system for an aircraft propulsion system comprising:

a series of condensers where water is condensed from an exhaust gas flow, wherein each of the series of condensers define a passage for exhaust gas flow such that water recovered from the exhaust gas flow drains downward in a direction of gravity through each of the series of condensers;

a series of water separators where condensed water is separated from the exhaust gas flow from a corresponding one of the series of condensers; and a nacelle, wherein the series of condenser and the series of water separators are supported in the nacelle and wherein the nacelle includes a cooling air duct assembly where a portion of inlet airflow is communicated to each of the series of condensers for providing a cooling flow through each of the series of condensers.

12. The water recovery system as recited in claim 11, wherein the nacelle includes a bypass air duct assembly where a portion of an inlet airflow is bypassed around the series of condensers and a core engine.

13. A method of operating an aircraft propulsion system comprising:

generating an exhaust gas flow with a core engine including a compressor, combustor, and turbine section;

coupling a propulsor to a power turbine configured to be driven by expansion of the exhaust gas flow about a propulsor axis by the core engine;

condensing water in a series of condensers that each include a passage for the exhaust gas flow, wherein the passage for the exhaust gas flow is defined such that water recovered from the exhaust gas flow drains downward in a direction of gravity;

separating water from the exhaust gas flow in one of a series of water separators in flow communication with the passage of a corresponding one of the series of condensers; and generating a steam flow communicated to the combustor in an evaporator system from water received from the series of water separators, wherein the evaporator system includes a plurality of evaporators that communicate exhaust gas flow radially outward to a corresponding one of the series of condensers.

14. The method as recited in claim 13, further comprising communicating a cooling airflow to each of the series of condensers through a cooling air duct assembly and bypassing a portion of an inlet airflow around the series of condensers and the core engine.

* * * * *